United States Patent [19]
Phelps

[11] 3,917,764
[45] Nov. 4, 1975

[54] SLOPED FILM FILL ASSEMBLY COOLING TOWER

[76] Inventor: Peter M. Phelps, 15 Buckeye Way, Kentfield, Calif. 94904

[22] Filed: Jan. 26, 1973

[21] Appl. No.: 327,154

[52] U.S. Cl. .......... 261/111; 261/112; 261/DIG. 11
[51] Int. Cl.² ........................................... E04H 5/12
[58] Field of Search ............ 261/112, 111, DIG. 11

[56] References Cited
UNITED STATES PATENTS

| | | | |
|---|---|---|---|
| 1,823,269 | 9/1931 | Grilli | 261/112 |
| 2,776,121 | 1/1957 | Fordyce | 261/111 |
| 2,917,292 | 12/1959 | Hittrich | 261/112 |
| 2,971,750 | 2/1961 | Boling | 261/111 |
| 3,084,918 | 4/1963 | Kohl et al. | 261/112 |
| 3,132,190 | 5/1964 | Engalitcheff, Jr. | 261/112 |
| 3,227,429 | 1/1966 | Renzi | 261/DIG. 11 |
| 3,262,682 | 7/1966 | Bredberg | 261/112 |
| 3,395,903 | 8/1968 | Norback et al. | 261/112 |
| 3,467,364 | 9/1969 | Zathureczky et al. | 261/112 |
| 3,500,615 | 3/1970 | Meek | 261/112 |
| 3,643,931 | 2/1972 | Henning | 261/112 |

Primary Examiner—Tim R. Miles
Attorney, Agent, or Firm—Flehr, Hohbach, Test, Albritton & Herbert

[57] ABSTRACT

A cooling tower with a film fill assembly having an inclined principal plane adjacent a gas inlet at the same general elevation. The assembly comprises a number of sheets (preferably of the corrugated type) with ample spacing there-between for the passage of gas and liquid. Multiple spaced-apart assemblies may be utilized for various tower applications. Also, splash-type fill may be disposed to the interior or exterior of the film fill assembly for increased gas-liquid contact.

11 Claims, 7 Drawing Figures

SLOPED FILM FILL ASSEMBLY COOLING TOWER

BACKGROUND OF THE INVENTION

Conventional cooling towers of the counterflow type employ a generally horizontal fill with an air opening below the lower surface of the same. Counterflow fills of the film type have a relatively good heat transfer coefficient. The air is drawn from below the fill and out the tower by a fan positioned above the fill. When the distance between the fill and base of the tower is relatively small, the air must be drawn from the surroundings into the tower at a relatively high velocity and, when it reaches a position below the fill, is forced to turn abruptly at a sharp angle to proceed upwardly through the fill. This requires high fan power requirements. On the other hand, by building the tower on relatively high supporting legs, the velocity of the incoming air is somewhat reduced but the overall height of the tower is substantially increased. Among the disadvantages of such height increases are increased pumping head, structural wind loads, and general appearance.

Conventional crossflow towers comprise a relatively thin vertical fill section with the water being fed from an overhead source and the air being drawn therethrough from air inlets at the side of the tower. Since there is no necessity for the air to make radical changes of direction in the fill and the air inlet is spaced along the entire height of the fill, the overall fan power requirements are usually less than those of a conventional counterflow tower as set forth above.

A crossflow cooling tower is inherently less efficient with respect to heat transfer than a counterflow tower based on a unit of fill. Another disadvantage of the crossflow cooling tower is that the water is loaded onto the top of the relatively thin crossflow fill. There is a maximum water load beyond which the water will not redistribute effectively because it will start gushing in a steady stream through the tower. When this maximum water load is exceeded in a crossflow tower of the film fill type, the water will not cling to the fill leading to relatively poor heat transfer between the air and water. Also, resistance to the transversely flowing air is substantially increased requiring excessive fan power. This problem of water loading cannot be effectively overcome by widening the fill in the direction of air flow because there is a limiting factor on cooling efficiency relative to the thickness of the fill. A major factor in this limit is that the fan power for the longer air path through the fill disproportionately increases in comparison to the advantages to be attained by easing the above water load problems.

A theoretical attempt to combine certain counterflow and crossflow features was made in U.S. Pat. No. 3,227,429 in which a series of offset cellular units with all walls of the cells inclined to the horizontal are illustrated in FIG. 12. The gas and liquid travel in the same direction, either concurrently or countercurrently, generally parallel to the cell side walls. Since the bottom cell walls or splash plates of the above patent are inclined at a steep angle, the liquid flows through the packing in rushing streams, rather than gradually descending in a gravitating path, and so does not spread out into thin films onto the side walls of the cells. The liquid actually concentrates rather than spreading out. This rapid concentrated flow of liquid greatly reduces the efficiency of the illustrated packing.

Corrugated film type fill is relatively efficient in either a counterflow or crossflow cooling tower. When utilized in conventional (horizontal) counterflow type tower, variations in the direction of the corrugations will affect the ease or difficulty of gas and liquid passage in a similar manner. For example, by disposing the corrugations at a relatively vertical inclination, the gas path is eased for lower power requirements but so is the liquid path leading to relatively poor film formation and low liquid residence time. On the other hand, by disposing the corrugations at a relatively horizontal inclination, the gas must travel through a tortuous path which greatly increases the fan power requirements.

SUMMARY OF THE INVENTION AND OBJECTS

It is a general object of the invention to provide a liquid-gas contact tower which combines certain of the aforementioned advantages of the counterflow and crossflow cooling towers while eliminating certain disadvantages of the same.

It is a more specific object of the invention to provide a cooling tower having the good air-liquid contact characteristics of a counterflow film type filled tower combined with an air inlet opening at the same general elevation as the fill.

It is a further object of the invention to provide a tower of the foregoing type with increased water load capacities.

It is an additional object of the invention to provide a tower of the foregoing type in combination with conventional crossflow or counterflow splash plates.

It is another object of the invention to provide a tower of the foregoine type utilizing multiple spaced-apart film fill sections.

Other objects of the invention will be apparent from the following description taken in conjunction with the appended drawings.

In accordance with the above objects, the present invention relates to a cooling tower with film fill means having an inclined principal plane adjacent a gas inlet opening at the same general elevation. The film fill means comprises a plurality of sheets mounted so that adjacent sheets are sufficiently spaced for the passage of gas and liquid and being formed to spread the liquid gravitating onto the upper surface of the means into a thinner, more uniform film at the lower surface thereof. Splash-type fill may be disposed either to the interior or exterior of the film fill means to increase gas-liquid contact. When the air is to be directed generally horizontally toward the interior of the film fill means, the splash-type fill will be generally horizontal. On the other hand, when the air is to be redirected to a generally vertical direction, the splash decks will be disposed in a generally upright direction.

A plurality of spaced-apart film fill means may be mounted in the tower. Where the film fill means do not extend the full height of the tower, perforate means such as a perforate pan is provided to extend between the lower edge of the lower surface of the upper film fill means and the upper edge of the upper surface of the lower film fill means to provide a barrier to gas flow while permitting liquid to gravitate therefrom. This prevents the air having a free passage to avoid travel through the film fill means. Such perforate means is not required where the film fill means extends across substantially the entire tower height available for gas passage since in this configuration the gas necessarily passes through the film fill means.

In one type of film fill means, spacer elements extending between adjacent ones of the sheets are utilized to mount the same in parallel side-by-side relationship. Such spacer elements are of a size and shape which neither substantially impede the vertical flow of gravitating liquid nor cause collection of the same in concentrated streams. In this manner, the liquid gravitating onto the upper surface is spread into a thinner, more uniform film at the lower surface. Also, the sheets may include spaced-apart indentations to enhance mixing of gas and liquid.

In another type of film fill means, the parallel sheets are of the corrugated type having ridges and grooves so that sufficient space is provided between grooves of adjacent sheets for the passage of gas and liquid. By disposing the ridges of alternate sheets across the ridges disposed between alternate sheets, spacing between sheets is accomplished without the necessity of spacer elements. Alternatively, such spacer elements may be employed. One advantage of utilizing corrugated sheets in conjunction with the inclined film fill is that the air may be independently channelled to a low resistance air path, e.g. relatively horizontal, while the liquid, in contrast, is forced to proceed through a tortuous path. This combination increases gas-liquid contact while reducing the fan power requirements. For this purpose, the corrugations are disposed at an inclination between 0° and 45° to the horizontal.

DETAILED DESCRIPTION OF THE PREFERRED EMBODIMENTS

In general, the present invention concerns the utilization of sloped film fill in a gas-liquid contact tower. Although useful in gas stripping and the like, such towers will be designated "cooling towers" herein as they are most commonly utilized for cooling a liquid, such as water, by inducing the surrounding gas, air, into the tower to contact and thereby cool the water. As will be more fully described hereinafter, by sloping the film fill, the advantages of both counterflow and crossflow type fill are combined while minimizing the disadvantages. A number of different film fill types may be employed in accordance with the invention. In addition, auxiliary splash type fill may be employed.

Figure 1:
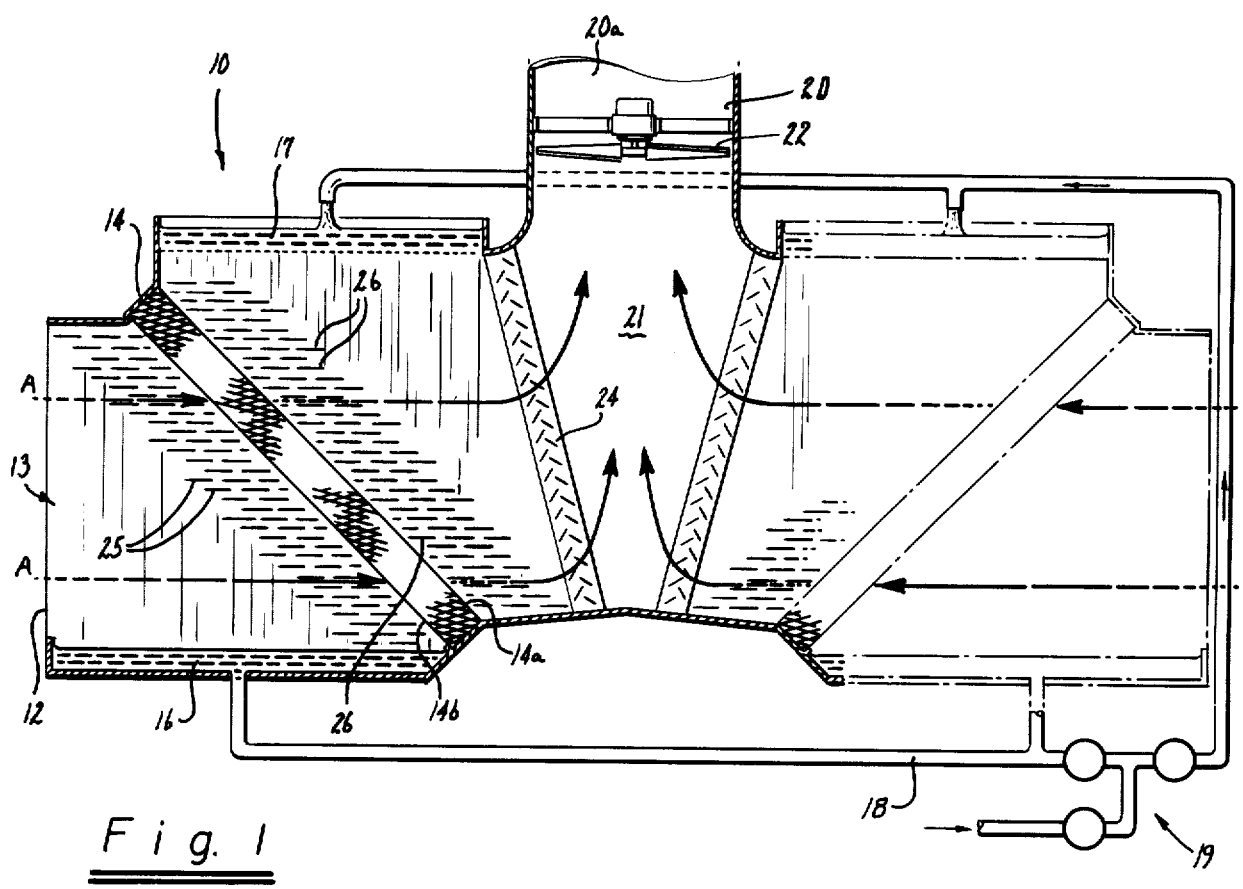
FIGS. 1–4 illustrate different embodiments of gas-liquid contact towers illustrating the sloped film fill of the present invention.

Referring to FIG. 1, a cooling tower, broadly denoted by the number 10, is illustrated comprising two similar cooling sections disposed on opposite sides of a central plenum chamber. For simplicity of description, only the section illustrated in the left portion of the drawing will be described. This section includes an upright side wall 12 having a gas inlet opening 13 extending along the major portion of the side wall and defined by a framing portion of the same. A film type fill assembly 14 of a type to be described more fully hereinafter, is suitably mounted in the cooling tower as by brackets or the like and having a principal plane inclined at a substantial angle to both the vertical and horizontal, 45° in the illustrated position. This angle may be substantially varied suitably between 20° and 70° depending upon the type of functional characteristics required for the tower. Fill assembly 14 is generally rectangular and has an upper surface 14a in communication with a major portion of the gravitating liquid (preferably with essentially all of the liquid). Assembly 14 also includes a lower surface 14b in communication with a major portion of gas entering inlet opening 13 (preferably with essentially all of the gas). A substantial portion of film fill assembly 14 is disposed at the same general elevation as gas inlet opening 13.

A cooled liquid basin 16 is disposed below assembly 14 in a position to receive liquid gravitating therefrom, and an open top perforate distribution pan or tray 17 is positioned directly above film assembly 14 to permit water to gravitate through the apertures or perforations onto the film assembly upper surface 14a. Suitable pumping structure, not shown, is operably coupled to basin 16 for removing liquid through line 18 and for delivering the water to equipment requiring the same for cooling and for returning the same to trays 17 through valve combination 19. If desired, a portion of the liquid removed in line 18 may be recycled to trays 17 for further cooling prior to delivery to the equipment.

Referring again to FIG. 1, a vertical stack 20 is secured to the top face of tower 10 and extends upwardly from a central plenum chamber 21 to define an upper outlet opening 20a for gas (air) exiting therefrom. Fan means 22 positioned within stack 20, adapted to be operable coupled to a suitable source of power for actuation, causes currents of air to be drawn through assembly 14 generally along path A and forced upwardly through chamber 21 and stack 20 for discharge through the upper portion of the latter. Alternatively, the cooling tower may be operated by natural induction by the elimination of fan means 22 in which case air would be induced to flow through the fill assembly by means of natural convection of the warm exhaust air rising through chamber 21.

A drift eliminator wall 24 is disposed across the path of air exiting from the cooling section and in a generally upright position to prevent gravitating water from being carried as a spray into the plenum chamber. Wall 24 may be of any conventional type such as a series of spaced inclined baffles to permit the free flow of air therethrough but to prevent significant quantities of liquid droplets to escape into the plenum chamber.

Referring again to FIG. 1, optionally conventional crossflow splash-type fill, such as generally horizontal slats 25 is disposed in an area of the tower between film fill assembly 14 and gas inlet opening 13 to further redistribute water gravitating from assembly 14. Other optional splash-type fill 26 of the above type is disposed between fill assembly 14 and plenum chamber 21 to intercept water gravitating from pan 17 before contacting the upper surface of assembly 14. The horizontal slatted splash-type fill does not change the general direction of air therethrough until it reaches the plenum chamber. It requires less fan power to change the direction of the air in the plenum chamber in the absence of the gravitating liquid. In the above arrangement, the air is traveling in a generally horizontal direction through the splash plates or decks transversely to the gravitating liquid. The splash plates may be disposed in a generally vertical direction so that the water and liquid contacted each other in counterflow relationship. In this embodiment, the splash fill would be deemed to be of a counterflow type.

Figure 5:
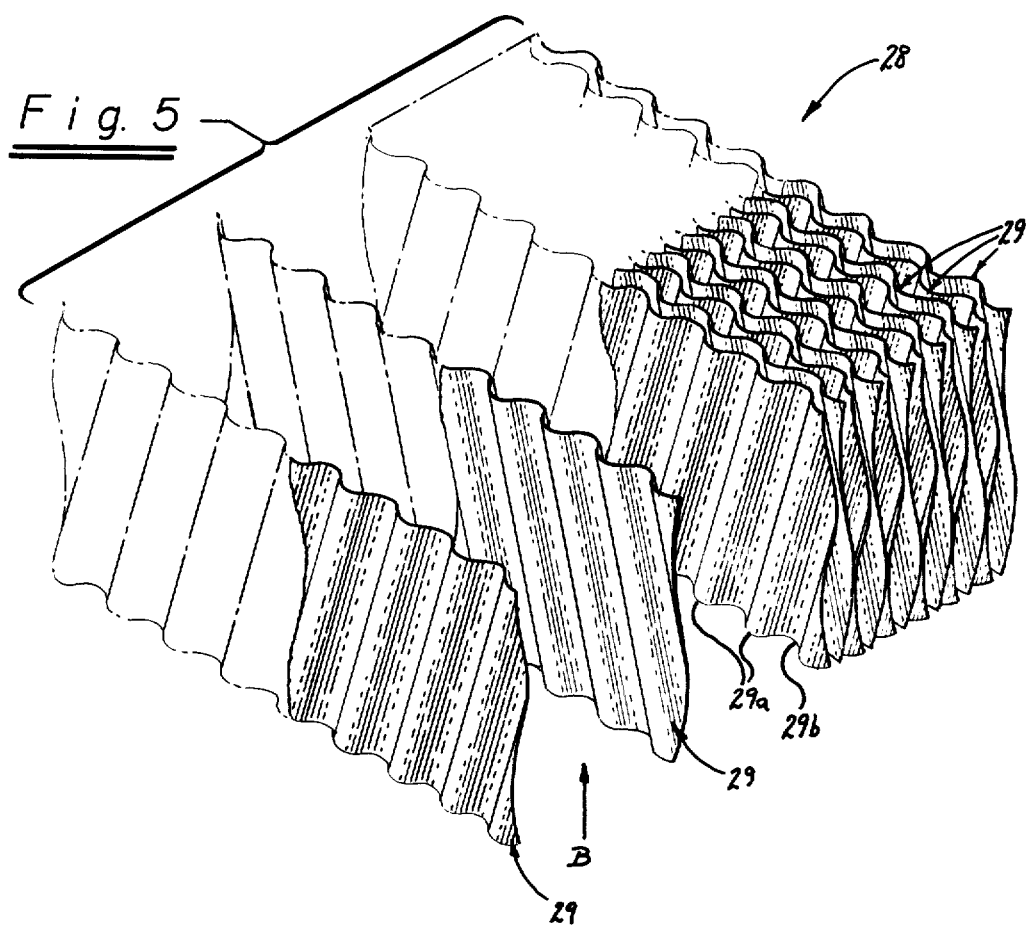
FIGS. 5, 6, and 7 illustrate various types of film fill to be utilized in the towers of FIGS. 1–4.

Referring to FIG. 5, a corrugated film fill, generally designated 28, is illustrated which is extremely well suited for use in the film fill assembly 14 in accordance with the present invention. Film fill 28, designated the cross corrugation film fill, comprises a plurality of corrugated sheets 29 with ridges 29a and grooves 29b disposed so that ridges of alternate sheets cross and abut against the ridges disposed between alternate sheets to form channels therebetween. The channels have a constantly varying width from 0 at the contact points between the sheets to a maximum of twice the distance between the ridges and grooves of individual sheets. In the illustrated embodiment, the corrugations extend between the upper and lower film fill assembly surfaces 14a and 14b, respectively. It is preferred that the air travel into and out of the corrugated fill in a path generally parallel to sheets 29 (e.g., along path B) without unnecessary redirection of the air stream to avoid consequent increased fan power requirements.

Sheets 29 are preferably liquid or water absorbing materials such as cellulose or asbestos. Paper sheets may be impregnated with a suitable substance such as a resin to impart the required mechanical strength. The sheets may be interconnected at the points of contact by means of adhesive qualities of the resin. Other preferably adhesive means may be utilized to interconnect sheets 29 to form assembly 14.

The angle that the corrugations of sheets 29 assume with respect to mounted assembly 14 may be varied substantially in accordance with heat transfer requirements of the particular tower. In one preferred embodiment, a major portion of the corrugations are at an inclination of 0° to 45° to the horizontal. The horizontally flowing air along the path of arrow A has a relatively easy path through fill assembly 14 as it is not required to abruptly change its direction. This leads to relatively low fan power requirements. Simultaneously the same fill provides a relatively tortuous path for the gravitating liquid to increase the redistribution and spreading of the liquid onto the fill surface. This is not possible in conventional (horizontal) counterflow towers since variation in the slope of the corrugations in the fill affects both the liquid and gas path in a corresponding m....

The angles between the corrugations of adjacent sheets 29 in film fill 28 may be varied substantially in accordance with the present invention. However, it is preferable that this angle be relatively small, say no greater than 30° to 45°, viewed in the direction of the air path. Where the bisector of the included angle between crossed corrugations is relatively horizontal, reduction of the included angle facilitates air passage through the fill to reduce the fan power requirements.

A cross corrugation arrangement of film fill 28 is well suited to the inclined film fill assembly of the present invention. This cross corrugation arrangement facilitates the film formation of the water as it spreads out since it presents a number of contact points between adjacent sheets for changing the direction of the water and thus slowing down the residence time of the water in the fill. For a relatively small included angle in the direction of the air path of the above type and a relatively horizontal angle bisector, the water is presented with crossing corrugations which disrupt and redistribute the water in a substantially more effective manner than the air. This is because the included angle in the direction of liquid flow is substantially greater than in the direction of air flow.

Referring again to FIG. 1, the inclination of the principal plane of the film fill assembly is illustrated as 45° to the vertical. It should be understood that this angle may be varied substantially as between 20° and 70° to the vertical depending on the requirements of the particular tower to be employed as more fully set forth with respect to FIGS. 3 and 4.

Figure 6:
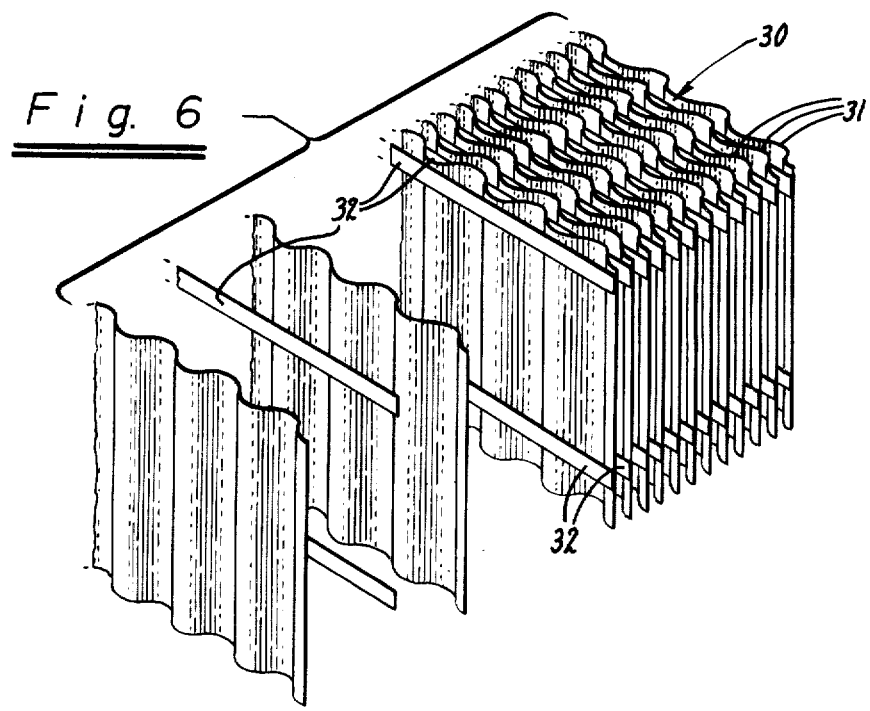

Another type of film fill which can be utilized in film fill assembly 14 of FIG. 1 is illustrated in FIG. 6 and generally designated as "parallel, spaced" corrugated film fill 30 comprising sheets 31. Each sheet 31 includes corrugations generally parallel to facing adjacent sheets which are spaced apart by suitable spacer elements 32. The same general type of corrugated sheets described in FIG. 5 may be employed for the sheets of FIG. 6. One advantage of the parallel corrugation configuration is that where the corrugations are disposed in fill assembly 14 in a generally horizontal direction, they present a relatively unobstructed path for the gas flowing along arrow A leading to low fan power requirements. Because independent spacer elements are provided, the liquid can gravitate in a film down the corrugations even when they are disposed in a horizontal direction. For this purpose, it is generally preferable to align the grooves of ridges with corresponding grooves and ridges of adjacent sheets so that there is no blockage therebetween to liquid flow.

Figure 7:
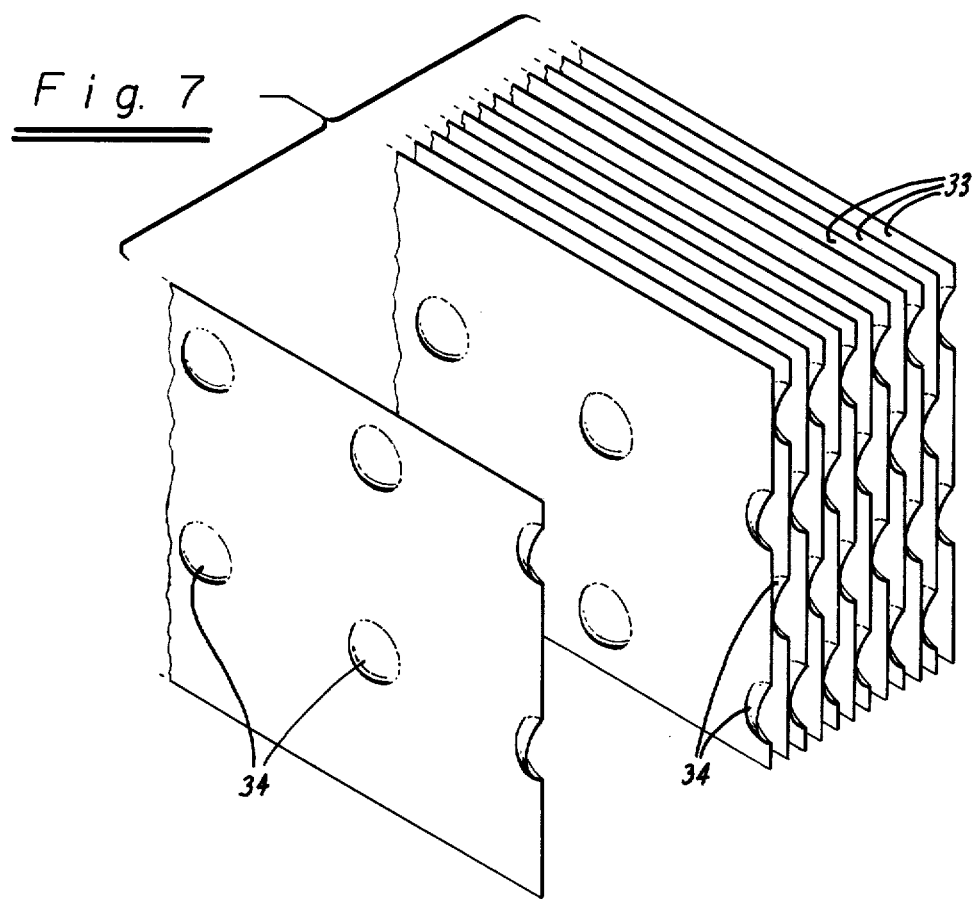

Another type of film type fill which may be employed in the fill assembly 14 of FIG. 1 is illustrated in FIG. 7 and comprises parallel essentially flat sheets 33 with spaced-apart hemispherical indentations 34 serving to disrupt the vertical flow of liquid along the sheets to enhance mixing of the gas and liquid, and to space apart the sheets without independent spacers. This spacing function is accomplished by the convex side of each sheet abutting against a flat portion of an adjacent sheet. In an alternative, not shown, the sheets maay be of an essentially flat configuration with independent spacer elements disposed to extend between adjacent spaced sheets. However, such spacer elements extending between adjacent sheets are of a size and shape which neither substantially impede the vertical flow of gravitating flow of liquid nor cause collection of the same in concentrated streams.

All of the foregoing film fill types spread liquid gravitating onto the upper surface 14a of film fill assembly 14 into a thinner, more uniform film at the lower surfade 14b to maximize the efficiency of the film type fill.

Figure 2:
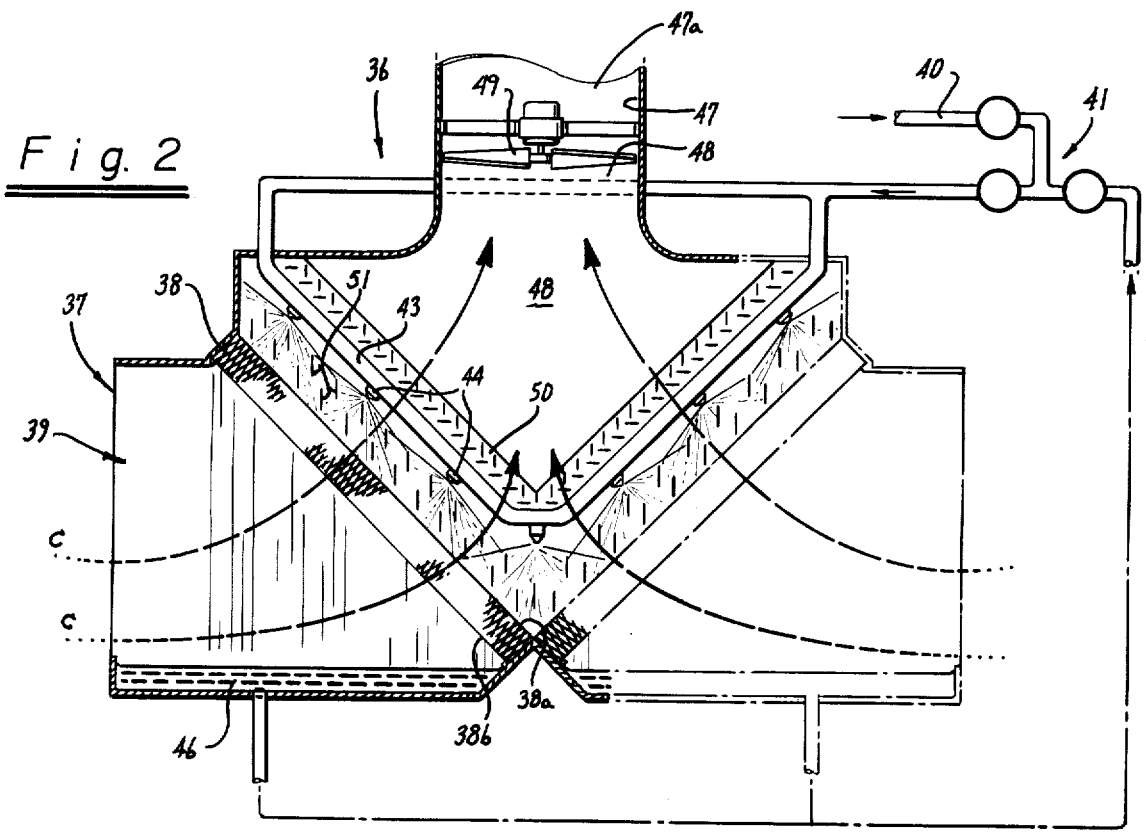

Referring to FIG. 2, another embodiment of a cooling tower according to the present invention is illustrated, broadly denoted by the number 36. The tower includes a tower side wall 37 and a sloped film fill assembly 38 having upper and lower surfaces 38a and 38b, respectively. A gas inlet opening 39 is defined in tower side wall 37 so that a substantial portion is at the same general elevation as fill assembly 38. The liquid to be cooled is supplied in line 40 and proceeds through valve combination 41 as described above with respect to the embodiment of FIG. 1. Liquid supply means such as header 43 with suitable nozzles 44 serves to supply liquid to upper surface 38a. Alternatively, distribution troughs, not shown, may be employed. A major portion of the gravitating liquid passes through fill assembly 38 and into cooled water basin 46 disposed below assembly 38. Suitable pump structure, not shown, is operably coupled to basin 46 and header 43 for removing cooled water from the former and delivering the same to equipment for cooling and returning the thus-warmed water to header 43.

Referring again to FIG. 2, a vertical stack 47 is secured to the top face of tower 36 extending upwardly from a central plenum chamber 48 to form an upper outlet 47a for air exiting therefrom. Fan means 49 positioned within stack 47, adapted to be operable coupled to a suitable source of power for actuation, causes currents of air to be drawn through assembly 38 and upwardly through chamber 48 and stack 47 for discharge generally along path C.

Drift eliminator wall 50 is provided above header 43 of a conventional type as discussed above. The drift eliminators serve to prevent excessive amounts of liquid from being drawn upwardly out the tower through outlet 47a.

Countercurrent splash-type fill comprising upright generally vertical splash plates 51 are provided between header 43 and fill assembly 38. Such splash-type fill generally of the counterflow type serves to assist the gas-liquid contact to increase the efficiency of the tower and to redirect the air.

The tower of FIG. 2 differs functionally from the tower of FIG. 1 in that the air along path C is forced to change directions from the generally horizontal inlet opening to the generally vertical outlet opening in the vicinity of the fill assembly 38. This requires a somewhat higher fan power than the tower of FIG. 1. On the other hand, the overall tower size is greatly reduced by the ability to position the lower end of sloped fill assembly 38 adjacent the lower end of a facing sloped fill assembly (illustrated in phantom) on the opposite side of the tower.

It is apparent from the embodiments of both FIGS. 1 and 2 that the sloped fill assemblies are preferably disposed to intersect the major portion and preferably all of the water gravitating from the liquid supply means to maximize the efficiency of the film fill.

Fill for film fill assembly 38 may be of any of the general types set forth above with respect to FIGS. 5-7. When it is deemed desirable to redirect the air within the film fill, corrugated fill such as the type illustrated in FIGS. 5 and 6 may be employed. It is preferred that the parallel corrugations of FIG. 6 or the bisector of the included angle of corrugations of FIG. 5 be disposed generally toward the desired new direction.

Utilizing the film fill means described above in fill assembly 38 of FIG. 2, liquid gravitating from header 43 onto upper surface 38a is spread out into a thinner, more uniform film upon passage through assembly 38 and so upon exit from lower surface 38b.

Figure 3:
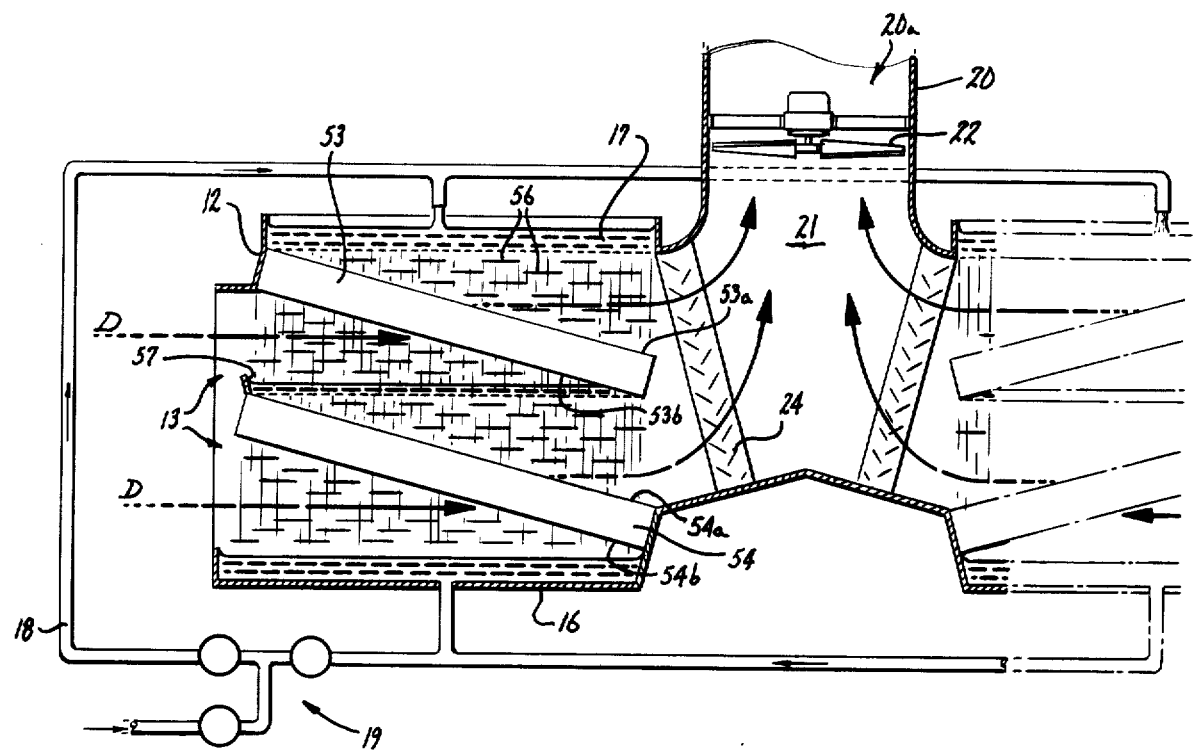

Referring to FIG. 3, another embodiment of the present invention includes at least an upper and lower film fill assembly 53 and 54, respectively, comprised of any of the foregoing types of fill. The plenum chamber, liquid supply means, air inlet and outlet and fan means are in generally the same relationship as in FIG. 1 and so like numbers will be utilized to denote like parts.

Fill assemblies 53 and 54 each have principal planes inclined at a substantial angle to both the vertical and horizontal preferably with the range set forth above. Fill assembly 53 includes upper and lower surfaces 53a and 53b, respectively, and fill assembly 54 includes upper and lower surfaces 54a and 54b, respectively. The combination of the two fill assemblies is disposed to extend below the path of liquid gravitating from liquid supply means or pan 17 and preferably intersects essentially all of such liquid.

It is important that the major portion, and preferably essentially all, of the air entering inlet opening 13 be prevented from bypassing film fill assemblies 53 and 54. If a major opening around the film fill assemblies were provided, the air would take this path being the easiest one. To prevent this, perforate means comprising perforate pan 57 is provided having openings large enough to permit liquid gravitating from assembly lower surface 53b to pass therethrough and contact assembly upper surface 54a. On the other hand, pan 57 should form a barrier to gas flow. To accomplish this, pan 57 preferably extends from the lower edge of lower surface 53b to the upper edge of the upper surface 54a. In this manner, a major portion of all gas entering the gas inlet opening 13 between fill assemblies 53 and 54 is directed through fill assembly 53.

In the illustrated embodiment, splash-type fill means suitably of the crossflow type comprises generally horizontal splash plates or decks 56 which may be installed in a convenient portion of the tower. As illustrated, decks 56 are disposed below pan 17 and above assembly 53, between assemblies 53 and 54 on both sides of perforate plate 57, and below assembly 54. Such splash-type fill provides increased gas-liquid contact efficiency with respect to that portion of the tower which is not utilized for the film fill assembly.

The configuration of FIG. 3 is particularly well suited to sloping at relatively small angles to the horizontal, say 20° to 45°. It should be apparent that at such relatively slight sloping a large upper surface of each of the film fill assemblies is available to accommodate a large water load.

In operation of the cooling tower of FIG. 3, air enters the tower through air inlet opening 13 generally along the path of arrows D through assemblies 53 and 54 and is drawn by fan means 22 upwardly out stack 20 and out of the tower. The liquid gravitates through fill assembly 53, pan 57, fill assembly 54 and into basin 16. Because of the positioning of pan 57, essentially no air from inlet 13 bypasses the combination of the fill assemblies.

Figure 4:
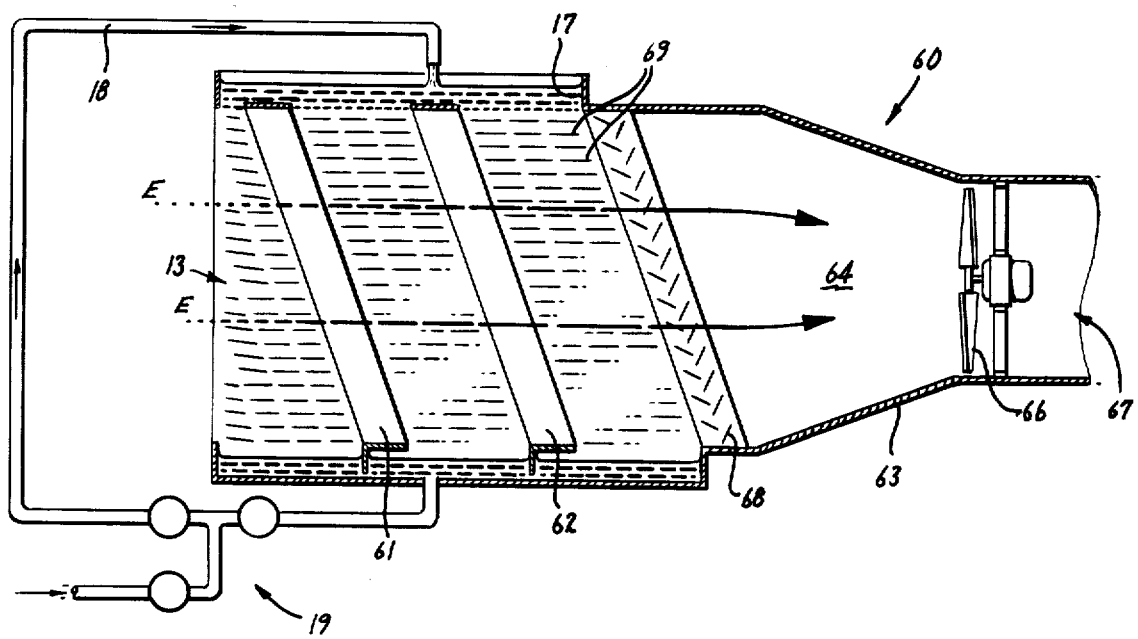

Referring to FIG. 4, another embodiment according to the invention, generally indicated by the number 60 utilizes a generally horizontal gas exit together with a combination of spaced film fill assemblies. In the illustrated embodiment, corresponding liquid supply and removal lines, and air inlet openings and side walls are utilized as in FIG. 1 so like numbers will be used to denote like parts. Outer and inner film fill assemblies 61 and 62, respectively, are mounted to project from tray 17 to basin 16 across the path of the major portion (preferably essentially all) of the air entering air inlet opening 13.

A generally horizontal stack 63 is secured to the side wall of tower 60 and extends longitudinally from a central chamber 64 to form a side outlet opening 67 with a substantial portion of the same at the same general elevation as film fill assemblies 61 and 62. It is apparent that the air exits from opening 67 at the same general elevation as it enters inlet opening 13. A drift eliminator wall 68 is provided to prevent the air from carrying a substantial portion of the liquid out the stack 63.

The same general type of film fill as set forth above may be utilized in fill assemblies 61 and 62. If corrugated fill or other direction orientating fill is utilized, it is preferred that the corrugations be disposed horizontally or at a relatively slight angle to the horizontal.

In the illustrated embodiment, surrounding air is drawn through inlet opening 13 along path E through film fill assemblies 61 and 62 and exits horizontally through stack 63 by fan means 66.

It should be apparent that where a combination of film fill assemblies are utilized as in FIG. 4, it is preferable but not essential that each one extend the entire distance from the top to the bottom of the cooling chamber within the cooling tower. The combination of the fill assemblies blocks the major portion (preferably essentially all) of gas entering inlet opening 13 and that such fill assemblies extend in a horizontal plane in the path of the major portion of gravitating liquid from tray 17.

Referring again to FIG. 4, crossflow type splash fill comprising splash plates 69 are provided in those portions of the area below gravitating liquid which are not occupied by the film fill assembly. Such areas include the portion of the tower between gas inlet 13 and assembly 61, between assembly 61 and assembly 62, and between assembly 62 and drift eliminators 68.

The configuration of FIG. 4 is particularly well suited for film fill assemblies at a relatively high angle to the horizontal, say 45° to 70°. If the angle to the horizontal became too small, it would be relatively difficult to support the extremely long fill assemblies necessary to project from the top to the bottom of the tower. Also, the tower would be excessively wide.

A major advantage of the configuration of FIG. 4 is the relatively low fan power requirement since there is no necessity to change the direction of the entering gas or air. Furthermore, there may be areas where such a configuration would be more suitable.

One feature of utilizing the parallel space sheet configuration in the sloped fill of the present invention is common to all of the foregoing embodiments. That is, the air tends to take the shortest path through the film fill assembly in the absence of strong directional internal construction set as closely spaced corrugations. In contrast, the liquid tends to flow in an essentially vertical path. Thus, the path of the liquid is generally longer than the path of the gas resulting in lower fan power requirements and higher efficiency of the tower. This is to be contrasted with conventional countercurrent fill in which the gas and liquid have a path of essentially the same length.

A number of different cooling towers have been described above utilizing the sloped film fill assemblies of the present invention. It should be understood that variations may be made in both the type of fill and the tower configurations without departing from the scope of the present invention. For example, although the invention has been described with respect to one or two film type fill assemblies, it should be apparent that more than two may be utilized. In addition, corrugated fill may be used which does not have straight line corrugations. Also, two or more film fill assemblies of the foregoing type may be stacked without spacing therebetween. Furthermore, auxiliary fill other than of the splash type (e.g. widely spaced film fill) which functions in the manner of splash fill may be used in place of the splash fill for combination with the sloped film fill assembly of the present invention.

I claim:

1. A tower for contacting liquid and gas comprising at least one upright side wall having a gas inlet opening, means for supplying gravitating liquid to the upper portion of the tower, a gas outlet opening, film fill means mounted in said tower having opposed upper and lower surfaces, said film fill means having a principal plane inclined at an angle of between about 20° and 70° to the vertical and also disposed to intersect a gas path extending between said gas inlet and outlet openings, said upper surface being disposed below said liquid supply means to intersect liquid gravitating therefrom, said lower surface being in communication with said gas inlet opening and said upper surface being in communication with said gas outlet opening, a major portion of said film fill means being at the same elevation as said gas inlet opening, said film fill means comprising a plurality of sheets mounted so that adjacent sheets are sufficiently spaced apart for the passage of gas along said path and of liquid gravitating from said liquid supply means, said film fill means being formed to spread liquid gravitating onto said upper surface into a thinner, more uniform film at said lower surface, and splash-type fill disposed between said film fill means and said liquid supply means to provide increased liquid distribution onto the film fill means, said sheets being essentially vertically disposed to provide an essentially vertical path to the liquid.

2. A tower as in claim 1 in which said splash-type fill is disposed in an area of said tower between said film fill means and said gas outlet opening.

3. A tower as in claim 2 in which a substantial portion of said gas outlet opening is of the same elevation as said gas inlet opening.

4. A tower as in claim 3 in which said splash-type fill is of a crossflow type with generally horizontal splash decks.

5. A tower as in claim 2 in which said gas outlet opening is disposed in the upper portion of the tower.

6. A tower as in claim 5 in which said splash-type fill comprises generally upright splash decks.

7. A tower as in claim 1 in which said splash-type fill is disposed in an area of said tower between said side wall and said film fill means.

8. A tower as in claim 1 in which said sheets are disposed so that the gas path into and out of the film fill assembly is generally parallel to said sheets.

9. A tower as in claim 1 in which the sheets of said film fill means are disposed to provide different paths for gas and gravitating liquid.

10. A tower as in claim 1 in which the film fill means is disposed to provide paths of substantially different lengths for gas and for gravitating liquid.

11. A tower as in claim 1 in which the splash fill means is at essentially the same elevation as the film fill means.

* * * * *